United States Patent Office 3,337,271
Patented Aug. 22, 1967

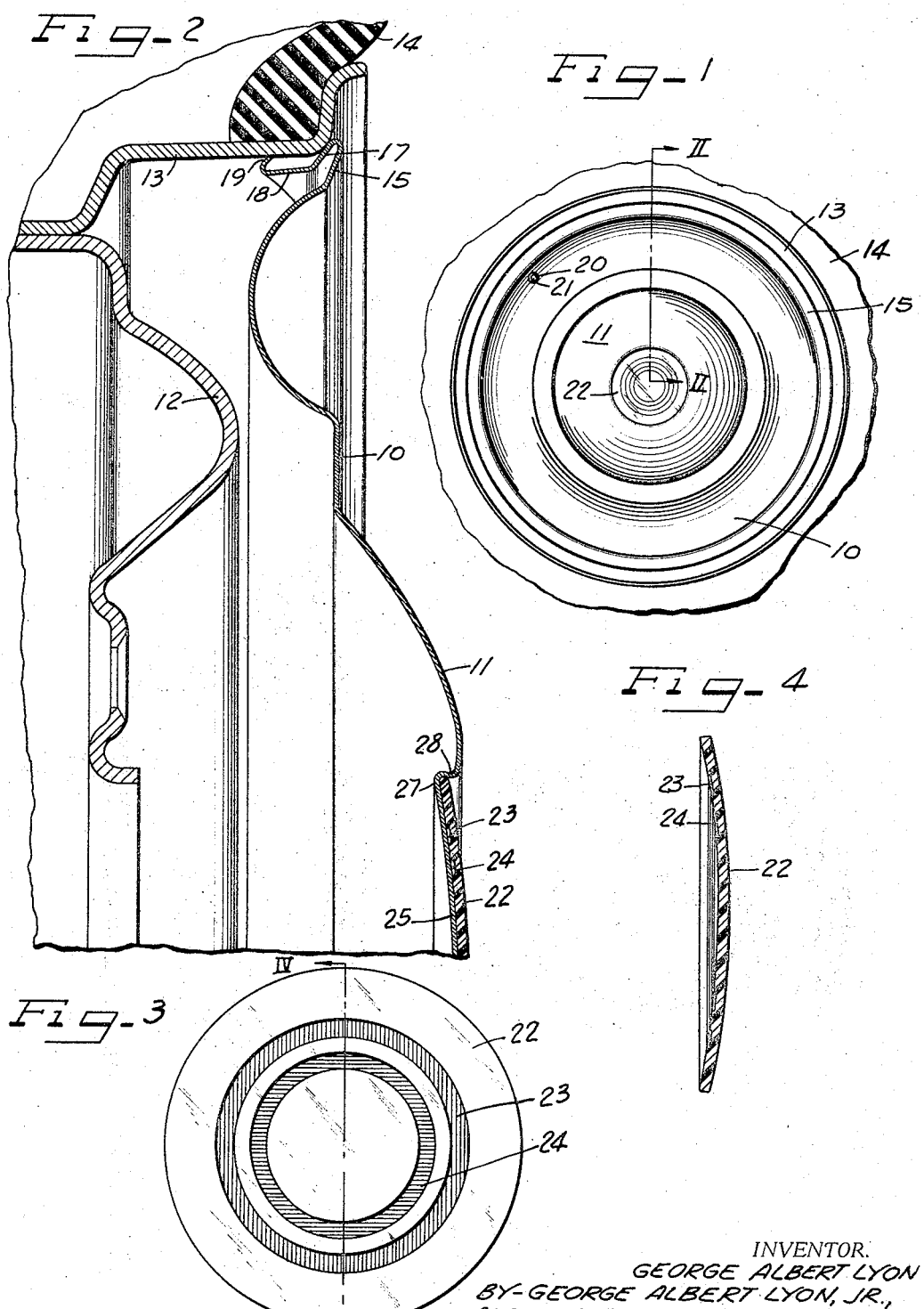

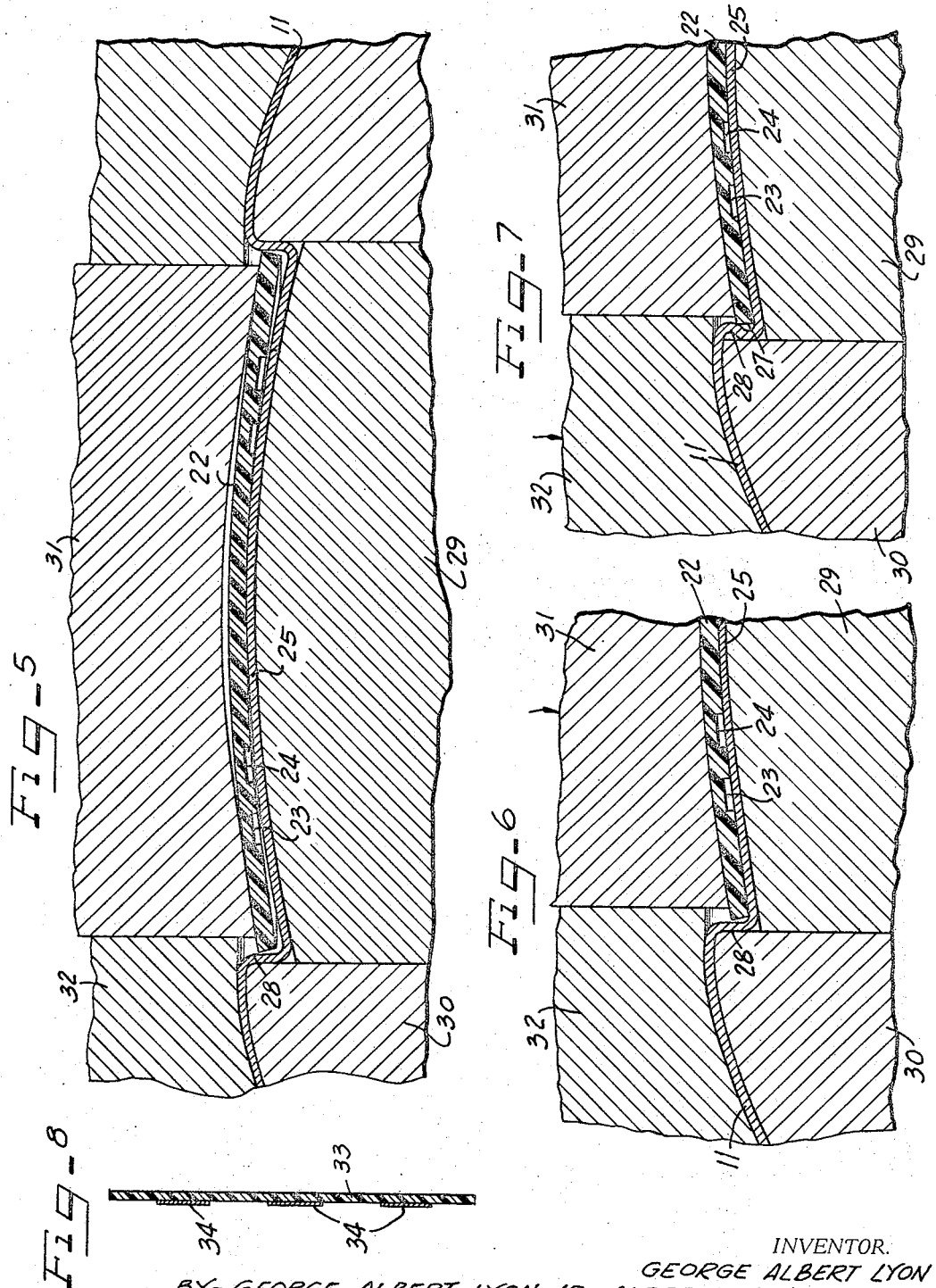

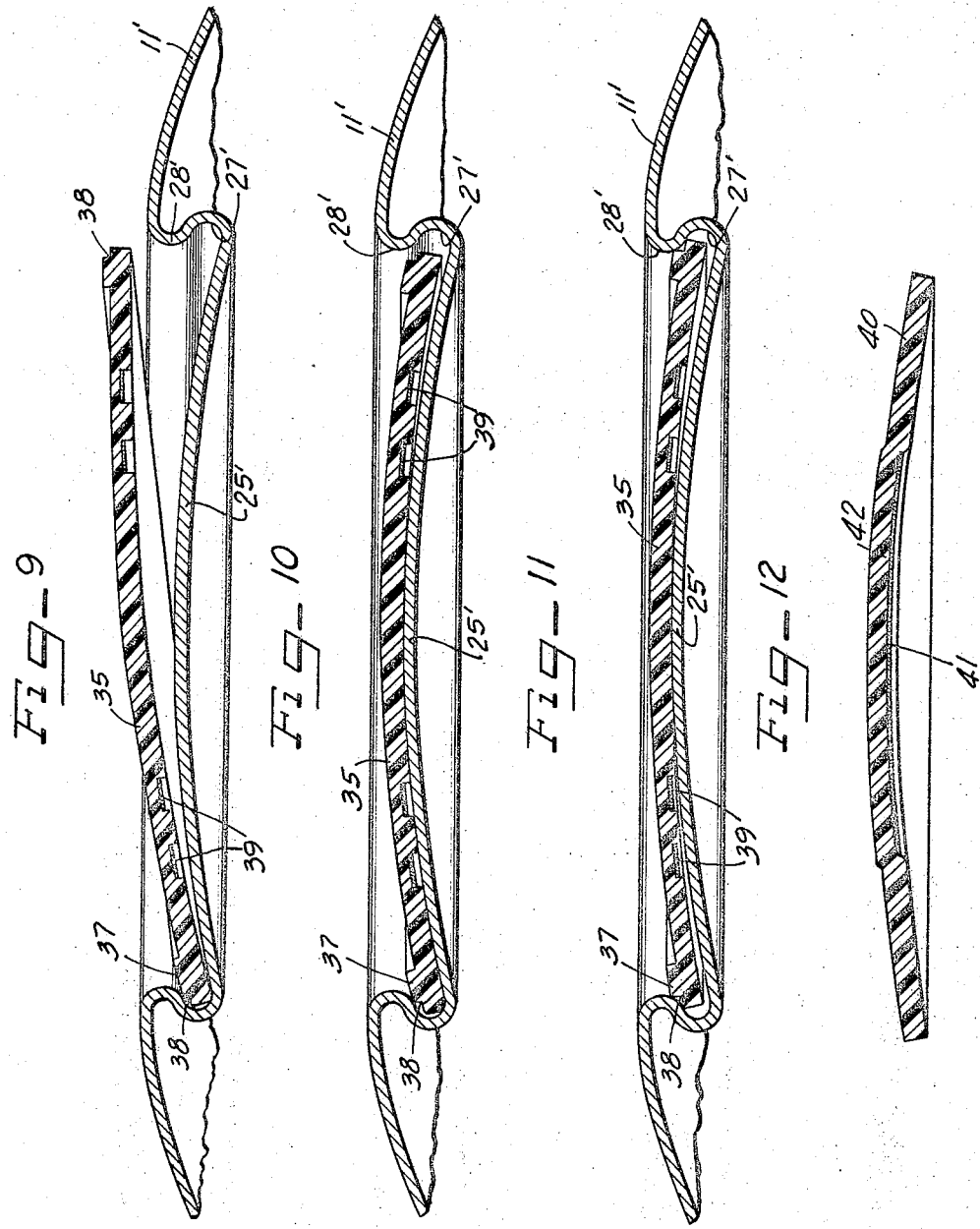

3,337,271
WHEEL STRUCTURE
George Albert Lyon, deceased, late of Detroit, Mich., by George A. Lyon, Jr., and Alberta Lyon Judd, both of Birmingham, Mich., and National Bank of Detroit, Detroit, Mich., co-executors
Filed Dec. 9, 1964, Ser. No. 438,805
2 Claims. (Cl. 301—37)

The present invention relates to improvements in wheel structures and more particularly concerns the ornamental and protective covering of the outer sides of vehicle wheels.

Vehicle wheel covers for disposition over the outer sides of vehicle wheels are desirably provided with a central crown insignia or identification marking or trademark display area which desirably takes the form of a medallion. One desirable structure of such a medallion is in the form of a plastic disk on which a desired design is provided on the back side of the disk to show through the transparent body of the plastic disk, with the design protectively overlain by the intervening thickness of the disk body.

Heretofore such medallion disks have been of substantial thickness such as up to a quarter of an inch with the design formed intaglio in the back side so as to appear when looking through the disk from the front or outer side thereof as being substantially three dimensional. This disk has been held in place in an opening by various means such as rings, adhesive and the like.

It is, accordingly, an important object of the present invention to provide a new and improved wheel cover and method of making the same.

A more specific object of this invention is to provide a wheel cover having a central medallion structure secured thereon in a new and improved manner whereby the disk can be efficiently attached to the cover at a minimum of expense.

Another object of the invention is to provide a wheel cover with a novel thin plastic medallion attached in an improved manner in a desirable protective, firmly backed and positive manner on the cover member.

Still another object of the invention is to provide an improved method of assembling thin resilient plastic medallions on wheel covers.

Yet another object of the invention is to provide improved means for securing plastic medallion members on wheel covers.

Still another object of the invention is to provide means for securing a plastic medallion in tensioned assembly with a wheel cover to prevent rattling.

Other objects, features and advantages of the present invention will be readily apparent from the following detailed description of a preferred embodiment thereof taken in conjunction with the accompanying drawings, in which:

On the drawings:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is an enlarged rear face elevational view of the medallion disk;

FIGURE 4 is a diametrical sectional detail view through the disk taken substantially on the line IV—IV of FIGURE 3;

FIGURE 5 is an enlarged fragmentary vertical sectional view through a die assembly and through the crown portion of the cover showing the parts in an initial stage of coaction in practicing the method of uniting the medallion with the cover member;

FIGURE 6 is a view similar to FIGURE 5 but showing the die parts in a subsequent forming coaction relationship;

FIGURE 7 is a similar view showing the die parts and the cover parts at the end of a forming stroke;

FIGURE 8 is a sectional view of a modified medallion;

FIGURES 9, 10 and 11 are similar fragmentary diametrical sectional views through another modification showing various stages of assembly; and FIGURE 12 is a fragmentary enlarged diametrical sectional view through a further modification.

As shown on the drawings:

Referring to FIGURES 1 and 2, a wheel cover member 10 is shown which is of the full disk type and adapted to be made from suitable thin gauge sheet metal such as stainless steel, brass and the like which will suitably take a surface finish as by polishing and plating. Centrally the cover member has an axially outwardly projecting crown portion which is adapted to overlie the central portion of a vehicle wheel body 12 which peripherally supports a multi-flange drop center tire rim 13 arranged to carry a pneumatic tire 14.

In the illustrated embodiment, the cover 10 has an outer margin 15 of a diameter to overlie the tire rim 13 and provided therebehind with an underturned flange 17 having axially inwardly extending retaining fingers 18 which have gripping terminals 19 engaging the opposed radially inwardly facing tire rim flange in press-on, pry-off gripping relation. In the assembly with the wheel a valve stem aperture 20 has extending therethrough a valve stem 21 projecting from the tire rim 13. After registration of the valve stem aperture 20 with the valve stem 21, the cover is adapted to be pressed home into position on the wheel from which it is adapted to be removed by application of a pry-off tool behind its outer edge to dislodge the grip of the retaining fingers 18 with the tire rim.

Centrally the crown portion 11 of the cover carries a thin plastic medallion disk 22. In a preferred form the medallion disk 22 comprises a suitable transparent resiliently flexible plastic material molded into slightly concave convex shape. On its back or axially inner side the disk 22 may be provided with any preferred ornamental or insignia background, desirably formed intaglio therein so as to afford a substantially three dimensional appearance from the axially outer side of the disk as viewed therethrough. Merely by way of example, the disk is here shown as having in the axially inner face thereof concentric outer and inner grooves 23 and 24, respectively, carrying suitable pigmentations such as paint or enamel in this instance illustrated as red in the groove 23 and blue in the groove 24 as indicated in FIGURE 3 by the conventional color linings.

For supporting and retaining the medallion disk 22, the cover crown 11 has a generally axially inwardly inset concave convex central seat 25 against which the medallion disk is engaged in face-to-face relation. By having the axially outer face of the seat portion 25 in a highly polished condition, it will appear that the back or axially inner face of the medallion disk 22 is completely metallized as viewed through the transparent disk, except for the colored design in the intaglio recesses as in the grooves 23 and 24, which will thus be emphasized and stand out prominently and ornamentally.

Retention of the medallion disk 22 on the seat 25 is effected positively and in a highly economical manner by having the perimeter of the disk engaging edgewise within a radially inwardly opening groove 27 provided by an insetting annular wall about the perimeter of the seat 25 and which wall is deflected radially inwardly at the axially outer side of the groove 27 to provide an annular overhanging interlock shoulder 28 overlying the margin of the disk contiguous its edge and thereby retaining such margin and the disk firmly seated on the seat 25 and retained against displacement. In this arrangement, even though the disk 22 may be in practice only about one-sixteenth of an inch thick, it is firmly supported by the relatively rigid arched concave convex seat 25 and is marginally protected within the groove 27 and by the rigid overhanging interlock annular shoulder rib 28.

In order to assure a firm uniform continuous seating pressure of the axially inner face of the disk 22 against the opposing face of the seat 25, the axially inner face of the disk 22 is initially on a slightly larger radius of curvature than the opposing axially outer seating face of the seat 25. Then, in the final assembly the disk is, so to speak, wrapped onto the convex crown afforded by the seat 25 and held under marginal compression against the seat whereby the entire disk is maintained in a firmly tensioned thrusting engagement of its axially inner face against the opposing face of the seat 25.

Initially the cover member 11 is completed throughout with the exception that the annular wall 28 defining the offset for the depressed seat 25 is substantially cylindrical as seen in FIGURES 5 and 6, and of a slightly larger diameter than the diameter of the medallion disk 22, although the inside diameter defined by the offsetting of the wall 28 and the edge extremity of the disk 22 and should preferably be so closely similar, that when the disk 22 in its differential radius relationship to the convex crown of the seat 25 is placed into the seat depression, it will be substantially centered in the depression as best seen in FIGURE 5. Completion of the cover up to this point includes polishing so that the axially outer or crown surface of the seat 25 has the desired highly polished surface.

In order to effect final assembled relationship of the medallion disk 22 with the cover, the cover member with the medallion disk 22 loosely assembled within the seat depression on the seat 25 is placed in a die assembly as shown in FIGURE 5 including a lower die structure having a central fixed supporting member 29 of a diameter and a crown contour to engage firmly against the underside of the seat portion 25.

Reciprocably slidably encircling the die member 29 is a ring die member 30 which is contoured to engage the underside of the cover crown 11 and about the radially outer side of the offsetting wall 28.

Coactive with the lower die members 29 and 30 are respective upper die members 31 and 32. The die member 31 is a central die member that has a lower end contoured to the radius of the seat 25 and of a slightly smaller diameter than the inside diameter of the offsetting wall 28. The remaining upper die member 32 is a ring member that encircles the member 31 slidably and relatively reciprocably and is contoured to the crown portion 11 about the offsetting wall 28 and is of an inside diameter to overhang the perimeter of the seat depression.

It will be understood, of course, that the lower portion of the die assembly including the members 29 and 30 is adapted to be carried by the bed or anvil portion of a die press while the upper die members 31 and 32 are adapted to be carried by the ram portion of the die press to move in a forming stroke downwardly and into engagement with the cover assembly on the lower die members and to move in a return stroke into clearance relation to the lower die members so as to enable placing and removal of the cover with respect to the lower die members.

In the first part of the forming stroke of the upper die members 31 and 32, the central upper die member 31 engages the disk member 25 and resiliently flexes and compresses it from the larger radius normal condition thereof as shown in FIGURE 5 to the smaller radius condition thereof against the seat portion 25 in firm hugging relation thereagainst as shown in FIGURE 6. Immediately following bottoming of the die member 31 with respect to the lower die member 29 and the interposed disk 22 and seat 25, the upper ring die member 32 moves downwardly relative to the central upper die member 31 as shown in FIGURE 7 and thereby presses down on the cover crown 11 and depresses the lower die member 30, which may be spring biased for this purpose. As a result of depression of the crown 11 relative to the seat 25 by this coaction of the die members 32 and 30, the vertical offsetting wall 28 by reason of being confined against radially outward movement by the surrounding portion of the lower die member 30 and the radially inward freedom afforded by the radially inwardly spaced disposition of the adjacent portion of the upper central die member 31, buckles uniformly radially inwardly into overlying clamping shouldering engagement with the margin of the disk 22 contiguous its edge, the edge being thus engaged within the groove 27 defined under the inwardly buckled shoulder.

In FIGURE 8 is shown a slight modification depicting a plastic medallion member 33 in a flat condition substantially the same as the medallion 22 already described. Instead of having the indicia or design indented into the back side of the medallion, however, in this instance, the applied design is in the form of flat printing 34 which may be put on in any suitable manner. The medallion 33 may then be assembled with the central crown portion depression seat of a cover member in the same manner as already described in connection with the medallion member 22, flexing it from the flat condition directly into the curved condition following the contour of the cover crown seat. On the other hand, the medallion member 33 may, after it has been imprinted, be suitably formed into a curved condition similar to that of the medallion member 22.

Referring to FIGURES 9, 10 and 11, a modification is shown wherein a medallion disk member 35 of suitable thin synthetic plastic material is constructed and arranged to be assembled with a cover member 11' having a central crown seat 25' with a preformed grove 27' and an overhanging annular retaining shoulder 28'. In this instance, the medallion is adapted to be assembled with the seat 25' by flexing and snapping it into place rather than by upsetting the shoulder 28' into clamping engagement with its perimeter. To this end, the disk member 35 is of a slightly smaller diameter than the inside diameter of the groove 27' and the groove 27' is slightly wider than the thickness of the marginal extremity of the disk member 35. Therefore, by flexing the disk member 35 to cramp it into a smaller diameter, it can be assembled with the cover crown seat by inserting one portion of the margin of the disk into the grove 27' as shown in FIGURE 9 to the bottom of the groove and then pushing the remainder of the disk member down against the seat 25' as shown in FIGURE 10 so that the entire edge of the disk is oriented with respect to the groove 27'. Finally, pressure on the disk is released and it assumes a centered position in the groove 27' with the edge of the disk under the shoulder 28' and the disk held under tension against the seat 25' by the shoulder 28'.

To assist in the springing of the disk 35 into the fully engaged position, to reinforce the margin of the disk, and to provide a shoulder structure that will coact with the rib shoulder 28' of the cover member, the outer face of the margin of the disk is provided with an annular marginal shoulder rib 37 projecting a limited distance from the face of the disk and having its outer perimeter inset from the edge extremity of the disk to provide a reentrant corner or annular rabbet groove 38 dimensioned to have the shoulder rib 28' of the cover engage therein in a stabilizing centering, retaining generally sealing relation. It will be observed that indented or recessed imprinting 39 is provided on the back side or inner face of the medallion disk 35 similarly as on the disk 22 previously described, although similar imprinting may be provided thereon as in the form of FIGURE 8.

In the modification of FIGURE 12 a synthetic plastic medallion 40 of thin material is provided in which the back or inner face of the medallion is provided with indented imprinting 41 and complementary embossing 42 on the outer face of the medallion member which assists in affording a three dimensional appearance of the design through the clear plastic material of the body of the medallion disk.

Plastic materials suitable for the present purpose include acrylic material and acetate butyrate. Where acrylic plastic materials are used, the medallion disks may be formed flat and then imprinted by hobbing and foil stamping, silk screening or otherwise. Acrylic base paint may be used. Where the disks are imprinted in the flat condition, they may be sag formed to the desired concave convex radius by heating the same, and this may be accomplished coincident with normalizing to relieve strains that may have been incurred during the printing especially if it is a recess printing or hobbing process. With an acrylic plastic material normalizing is accomplished at about 155° F.

In a desirable thickness, the medallion may be of about 1/16 inch thickness. Especially where the medallion is of an acrylic plastic material in this thickness there is little if any undesirable strain as a result of the tensioning of the medallion disk over the differentially radius crown of the seat against which it is thrust.

It will thus be apparent by the present method, not only can a thin low cost plastic medallion be provided carrying desirable ornamentation, indicia and insignia in a fully protected relationship against deterioration or abrasive or other disturbance incident to washing or otherwise cleansing the wheel cover, but ornamental effects are heightened and the medallion disk is substantially rigidly supported over its entire area, and all this is accomplished in a simple and highly efficient manner. Since any ornamentation or design is on the inner, protected side face of the medallion disk, there is a fully protective thickness of the plastic material of the disk intervening between the design and the outer exposed face of the disk. The inner or back face of the disk requires no protective coating or metallizing, since it is in full intimate firmly backed relation against the supporting seat surface afforded by the cover.

No special tabs or lugs or other separately formed attaching means are necessary to retain the disk in place, since the integral upset overhanging shoulder provided by the cover member effectively uniformly clamps and retains the disk marginally. This retaining means for the disk also assures that maximum exposure of the face of the disk is assured and there is no interference with uniform pleasing appearance of the design for which the medallion disk is primarily intended.

It may also be noted that the die press operation for securing the medallion disk and the assembled relationship with the cover is effective with extremely simple die structure and is adapted to be accomplished at high speed for low cost production.

It will be understood that modifications and variations may be effected without departing from the scope and novel concepts of the present invention.

What is claimed is:

1. A sheet metal wheel cover including means for retaining engagement with a vehicle wheel and having a central crown portion, a solid seat area depressed in said crown portion and defined about its perimeter by an annular offsetting wall having an axially outer portion buckled radially inwardly into an overhanging fold shoulder relative to the margin of said seat area and also having an axially inner portion defining with said buckled axially outer portion a radially inwardly opening groove, and a thin medallion complementary to and seated on and backed up by said seat area and having its margin engaged interlockingly in said groove underlying said fold shoulder and thereby held in place on the seat area, said medallion being of smaller diameter than said axially inner wall portion and having generally radially outwardly facing shoulder means spaced radially inwardly on said margin engaging said fold shoulder and thereby maintaining said medallion substantially centered and its edge spaced from said axially inner wall portion.

2. A wheel cover as defined in claim 1, in which said seat area is of a convex shape and said medallion is of a resiliently flexible material and normally of a larger radius concave convex shape and is compressively thrust against said seat area by said underlying engagement of said margin with said fold shoulder.

References Cited
UNITED STATES PATENTS

| | | | |
|---|---|---|---|
| 1,936,726 | 11/1933 | Mathewson | 29—200 |
| 2,343,043 | 2/1944 | Brugmann | 29—200 |
| 2,368,229 | 1/1945 | Lyon | 29—159 |
| 2,413,329 | 12/1946 | Lyon | 29—159 |
| 2,433,854 | 1/1948 | Lyon | 301—37 |
| 2,593,274 | 4/1952 | Dandurand. | |
| 2,629,957 | 3/1953 | Lyon | 301—37 X |
| 2,640,730 | 6/1953 | Lyon | 301—37 |
| 2,650,862 | 9/1953 | Lyon | 301—37 |
| 2,657,099 | 10/1953 | Judd | 301—37 |
| 2,674,495 | 4/1954 | Lyon | 301—37 |
| 2,725,257 | 11/1955 | Maurer | 301—37 |
| 2,821,438 | 1/1958 | Lyon | 301—37 |
| 2,940,781 | 6/1960 | Erikson | 301—63 |
| 2,994,979 | 8/1961 | Shoemaker | 301—37 |
| 3,167,358 | 1/1965 | Demrick | 301—37 |

BENJAMIN HERSH, *Primary Examiner.*

R. J. JOHNSON, *Assistant Examiner.*